3,098,743
BRAZING ALLOY
Paul R. Mobley, Cincinnati, Ohio, assignor to General Electric Company, a corporation of New York
No Drawing. Filed Nov. 24, 1961, Ser. No. 154,832
6 Claims. (Cl. 75—171)

This invention relates to brazing alloys and, more particularly, to an improved nickel base brazing alloy especially suitable for brazing nickel base structural alloys at about 1950° F.

In my co-pending application S.N. 154,831, filed November 24, 1961, and assigned to the assignee of the present invention, I have provided an improved nickel-chromium base brazing alloy particularly suitable for joining nickel base structural alloys sometimes referred to as "super alloys." However, in some special instances, particular flow characteristics coupled with adequate strength, ductility and oxidation resistance are required in a brazing alloy which is not erosive to a base metal.

A principal object of this invention is to provide a nickel base brazing alloy having a brazing temperature of about 1950° F., which has oxidation resistance to about 1550° F. and, which has good flow characteristics and wettability particularly in the presence of the oxides of titanium and aluminum and which will not erode nickel base super alloys.

These and other objects and advantages will be recognized from the following detailed description and examples which are meant to be illustrative of rather than limitations on the scope of the present invention.

Briefly, the alloy of this invention provides a nickel base brazing alloy consisting, by weight, essentially of 3–8% Cr, 3–8% Pd, 16–25% Ge, 4–22% Cu, with the balance nickel and incidental impurities.

One nickel base structural alloy with which the brazing alloy of the present invention is particularly useful consists, by weight, of 0.06–0.12% C, 18–20% Cr, 0.003–0.10% B, 10–12% Co, 9–10.5% Mo, 3–3.3% Ti, 1.4–1.6% Al, with the balance nickel and incidental impurities. It has been found that this nickel base structural alloy can be solution heat treated at about 1950° F. in order to provide optimum tensile strength properties. It was recognized that the alloy of the present invention has its liquidus temperature about or slightly below 1950° F. and therefore can be used as a brazing alloy in a brazing operation which can be conducted at the same time as the solution heat treatment is conducted. Another advantage of the alloy of this invention is that it is not erosive to the base material and yet has adequate strength, ductility and oxidation resistance at about 1550° F. at which temperature it is intended to operate.

The following table is representative of forms of the alloy of this invention as well as some alloy forms outside the scope of the present invention.

TABLE I

| Example | Composition (Wt. precent) | | | | |
|---|---|---|---|---|---|
| | Ni | Cr | Pd | Ge | Cu |
| P35 | Bal. | 5.3 | 5.3 | 17.1 | 33 |
| P35 | Bal. | | 5 | 30 | 40 |
| P37 | Bal. | 10 | 10 | 35 | 10 |
| P55 | Bal. | 7.1 | 5.9 | 17.9 | 24.7 |
| P56 | Bal. | 4.7 | 4.8 | 15.9 | 22.2 |
| P57 | Bal. | 2.7 | 3.1 | 14.0 | 22.1 |
| M1 | Bal. | 15 | 15 | 35 | |
| M100 | Bal. | 5 | 5 | 20 | 25 |
| B255 | Bal. | 7.3 | 8.1 | 24.8 | 5.1 |
| B263 | Bal. | 7.1 | 7.4 | 21.4 | 12.2 |
| B272 | Bal. | 7.3 | 7.2 | 21.3 | 15.2 |
| B274 | Bal. | 7.2 | 7.6 | 19.2 | 17.4 |

The alloy forms P56, M100, B255, B263, B272 and B274 are all within the range of the present invention. They can be brazed at about 1950° F., have adequate strength and ductility and have good oxidation resistance up to about 1550° F. In the alloy of the present invention, the particular range of germanium helps to adjust the melting point while at the same time it increases the alloy's room temperature toughness and improves oxidation resistance and room temperature ductility. In addition, germanium cooperates with the copper and palladium to provide good wettability on the surface of materials having elements such as titanium which form flow inhibiting surface oxides. The particular combination of copper, palladium and germanium unexpectedly provides an alloy which is not erosive and yet has desirable strength and ductility. The addition of palladium within the range of this invention provides improved wetting and flow characteristics at about 1950° F.

Referring to Table I, alloy P36, which does not include chromium but which includes relatively large amounts of germanium and copper, has poor oxidation resistance at about 1500° F. and is highly erosive to such nickel base structural alloys as described above. Alloy P37, having relatively larger amounts of chromium, palladium and germanium has poor oxidation resistance despite the increased amount of chromium. Alloy P55 having a relatively large amount of copper is too erosive and has a very low shear tensile strength at about 1450° F. Alloy P57 is within the range of this invention except for the germanium content. It meets all the other requirements except that its melting point was slightly too high because of the slightly lower amount of germanium. Alloy M1 having relatively large amounts of chromium, palladium and germanium in the absence of copper is highly erosive.

Although the alloys within the range of this invention are suitable for the intended use, Table II lists the preferred ranges within the scope of this invention from the standpoint of production handling.

TABLE II

| Example | Composition (Wt. Percent) | | | | | Liquidus (° F.) |
|---|---|---|---|---|---|---|
| | Ni | Cr | Pd | Ge | Cu | |
| A | Bal. | 6–8 | 6–8 | 19.5–21.5 | 4–6 | 1,950 |
| B | Bal. | 6–8 | 6–8 | 19.5–21.5 | 11–13 | 1,900 |
| C | Bal. | 6–8 | 6–8 | 19.5–21.5 | 16–18 | 1,900 |

Of the ranges of Table II, the range of example A is specifically preferred because of its flow characteristics at about 1950° F. for the particular structural alloy identified above.

The alloys of the above identified example were made by standard brazing alloy production methods well known in the art. For example, the ingredients were melted at about 2400° F. by vacuum induction melting and then poured in an inert gas atmosphere to produce flakes. The alloy was then pulverized into powder form by conventional methods.

Panels of the above identified nickel base structural alloy were brazed at about 1950° F. with various forms of the alloy of this invention and then aged at about 1400° F. for 16 hours to simulate production conditions for an article. The following Table III presents some average strength data typical of the alloy at different copper levels:

TABLE III

*Average Shear-Tensile Properties*

| Example | Temperature (° F.) | Indicated Shear Strength (p.s.i.) |
|---|---|---|
| B255 | Room | 37,200 |
| B263 | Room | 29,000 |
| B272 | Room | 27,300 |
| B255 | 1,250 | 30,700 |
| B263 | 1,250 | 28,800 |
| B272 | 1,250 | 12,000 |
| B255 | 1,450 | 11,700 |
| B263 | 1,450 | 11,900 |
| B272 | 1,450 | 9,300 |

Although the present invention was described in connection with specific examples it will be understood by those skilled in the art of metallurgy the modifications and variations of which the invention is capable.

What is claimed is:

1. A nickel base brazing alloy particularly suitable for brazing at about 1950° F. consisting essentially, by weight, of: 3–8% Cr; 3–8% Pd; 16–25% Ge; 4–22% Cu, with the balance nickel and incidental impurities.

2. A nickel base brazing alloy particularly suitable for brazing at about 1950° F. consisting essentially, by weight, of: 6–8% Cr; 6–8% Pd; 19.5–21.5% Ge; 4–18% Cu, with the balance nickel and incidental impurities.

3. A nickel base brazing alloy particularly suitable for brazing at about 1950° F. consisting essentially, by weight, of: 6–8% Cr; 6–8% Pd; 19.5–21.5% Ge; 4–6% Cu, with the balance nickel and incidental impurities.

4. A nickel base brazing alloy particularly suitable for brazing at about 1950° F. consisting essentially, by weight, of: 6–8% Cr; 6–8% Pd; 19.5–21.5% Ge; 11–13% Cu, with the balance nickel and incidental impurities.

5. A nickel base brazing alloy particularly suitable for brazing at about 1950° F. consisting essentially, by weight, of: 6–8% Cr; 6–8% Pd; 19.5–21.5% Ge; 16–18% Cu, with the balance nickel and incidental impurities.

6. A nickel base brazing alloy particularly suitable for brazing at about 1950° F. consisting essentially, by weight, nominally of: 7% Cr; 7% Pd; 20% Ge; 5% Cu, with the balance nickel and incidental impurities.

References Cited in the file of this patent

UNITED STATES PATENTS

| | | |
|---|---|---|
| 2,226,079 | Spanner | Dec. 24, 1940 |
| 2,815,282 | Rhodes et al. | Dec. 3, 1957 |
| 2,856,281 | Cremer et al. | Oct. 14, 1958 |
| 2,900,251 | Evans et al. | Aug. 18, 1959 |
| 2,900,253 | Evans et al. | Aug. 18, 1959 |
| 2,901,347 | McGurty et al. | Aug. 25, 1959 |
| 2,903,353 | Bredzs | Sept. 8, 1959 |
| 2,988,446 | Rhys | June 13, 1961 |
| 3,053,652 | Mobley et al. | Sept. 11, 1962 |

OTHER REFERENCES

"High Temperature Brazing," Battelle Technical Review, volume 5, No. 8, August 1956, by R. Evans.